United States Patent [19]
Carey

[11] Patent Number: 5,957,264
[45] Date of Patent: Sep. 28, 1999

[54] APPARATUS FOR HANDLING AND/OR CLEANSING TUBULAR ARTICLES

[75] Inventor: Roger Carey, Welling, United Kingdom

[73] Assignee: Coca-Cola & Schweppes Beverages Limited, United Kingdom

[21] Appl. No.: 08/750,722

[22] PCT Filed: Jun. 9, 1995

[86] PCT No.: PCT/GB95/01359

§ 371 Date: Feb. 18, 1997

§ 102(e) Date: Feb. 18, 1997

[87] PCT Pub. No.: WO95/34385

PCT Pub. Date: Dec. 21, 1995

[30] Foreign Application Priority Data

Jun. 15, 1994 [GB] United Kingdom .................... 9411990

[51] Int. Cl.⁶ .................................................. B65G 47/244
[52] U.S. Cl. ........................... 198/404; 198/402; 198/417
[58] Field of Search ..................................... 198/402, 403, 198/404, 417

[56] References Cited

U.S. PATENT DOCUMENTS

| | | | |
|---|---|---|---|
| 1,621,611 | 3/1927 | Thompson | 198/417 |
| 2,184,100 | 12/1939 | Mondloch | 198/403 |
| 2,604,200 | 7/1952 | Hohl et al. | 198/402 |
| 3,495,291 | 2/1970 | Copping et al. | 198/417 |
| 3,595,251 | 7/1971 | Tarantola | 198/417 |
| 3,785,473 | 1/1974 | Cook | 198/402 |
| 3,874,740 | 4/1975 | Hurd | 198/402 |
| 3,954,171 | 5/1976 | Chick et al. | 198/404 |
| 4,041,124 | 8/1977 | Seelye | 198/417 |
| 4,208,761 | 6/1980 | Ionescu | 15/304 |
| 4,313,767 | 2/1982 | Bemis et al. | 134/1 |
| 5,265,298 | 11/1993 | Young | 15/1.51 |

FOREIGN PATENT DOCUMENTS

A2310854 12/1976 France .
A1914510 1/1970 Germany .

*Primary Examiner*—William E. Terrell
*Assistant Examiner*—Patrick Mackey
*Attorney, Agent, or Firm*—Christie, Parker & Hale, LLP

[57] ABSTRACT

The apparatus comprises a cylinder housing a rotary scroll Tubular preforms are fed into the cylinder in an upright state and displaced along the cylinder by a fin of the scroll. A spring mounted on the fin engages each preform in turn and inverts it. The inverted preforms are then driven over a series of nozzles discharging ionised gas to purge the preforms of debris. The preforms are then discharged.

12 Claims, 4 Drawing Sheets

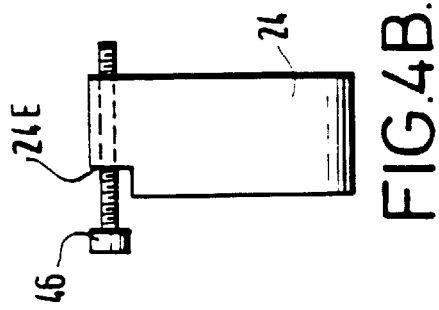
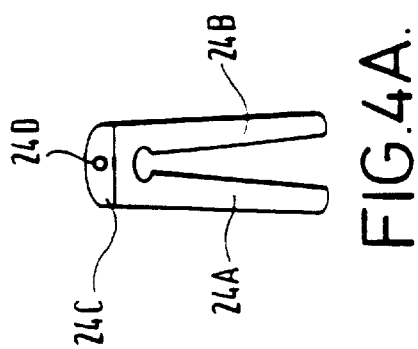
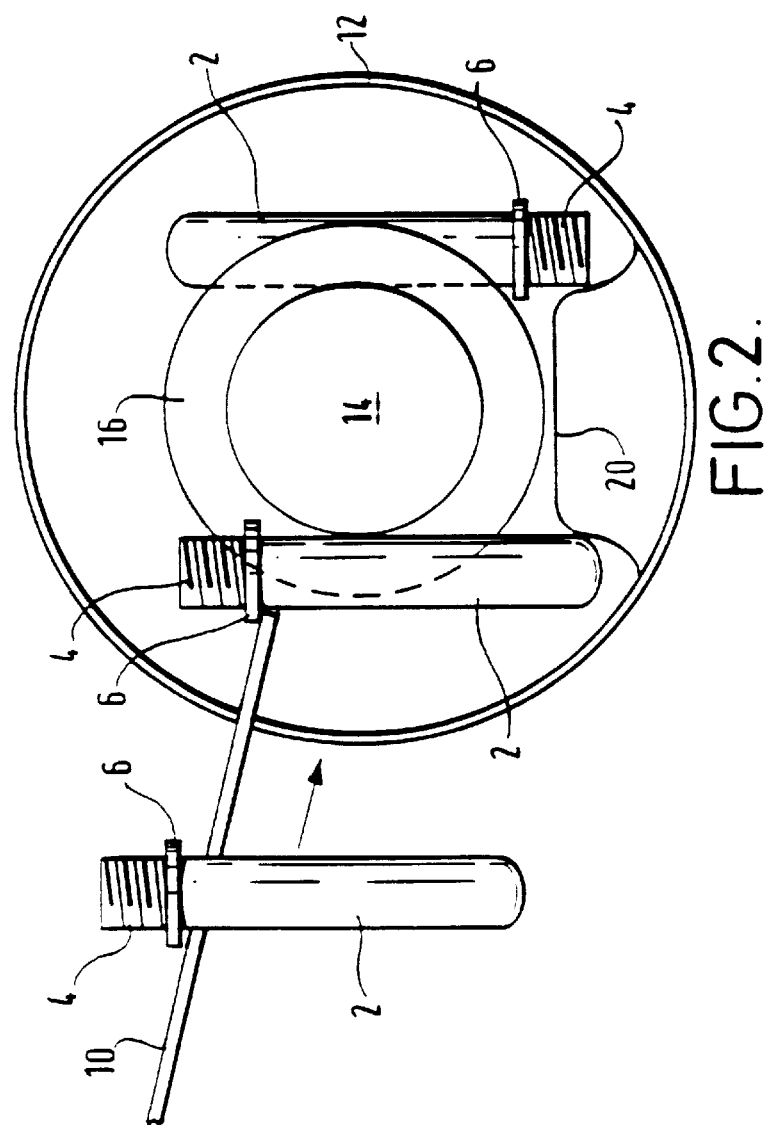

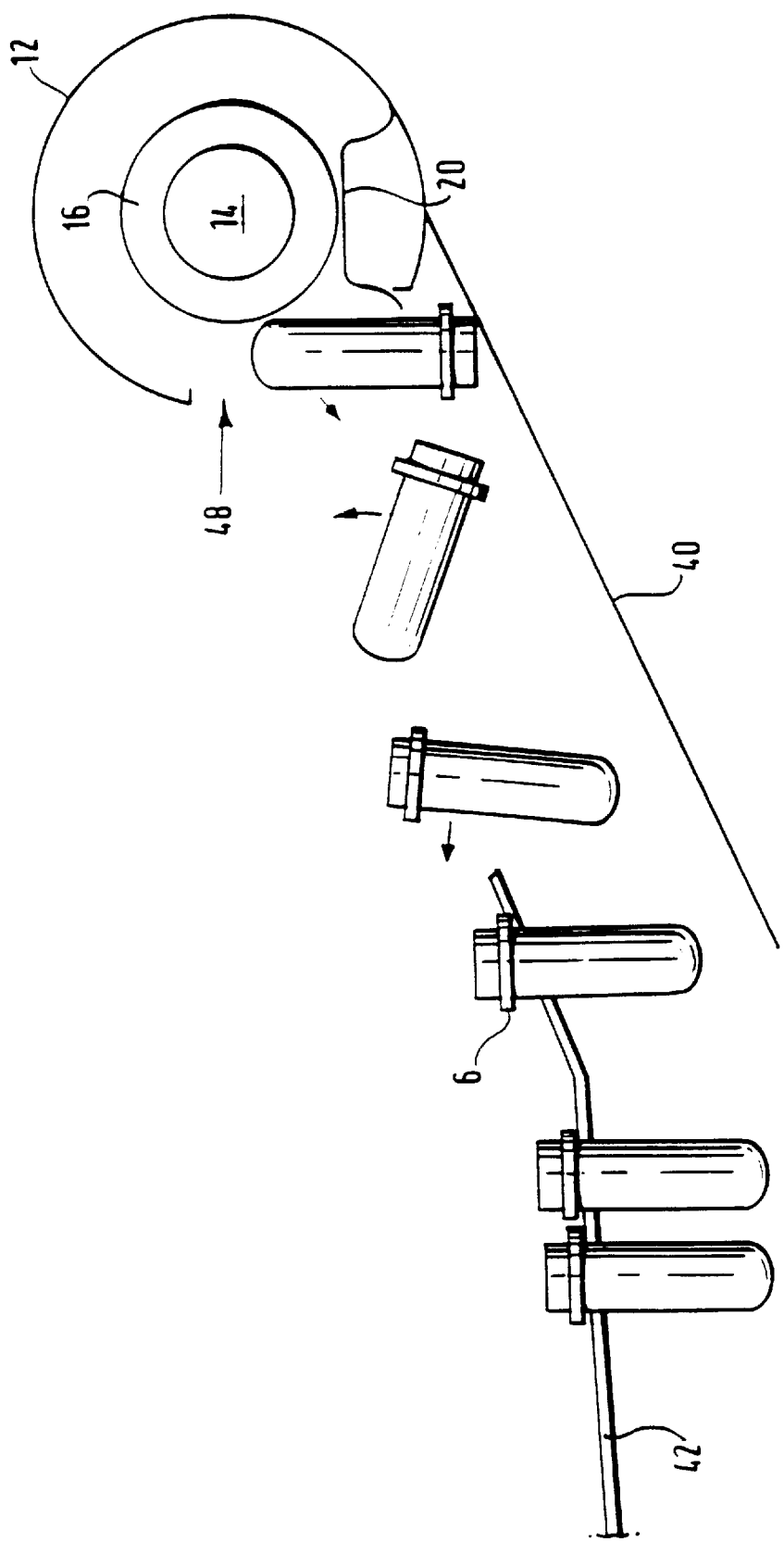

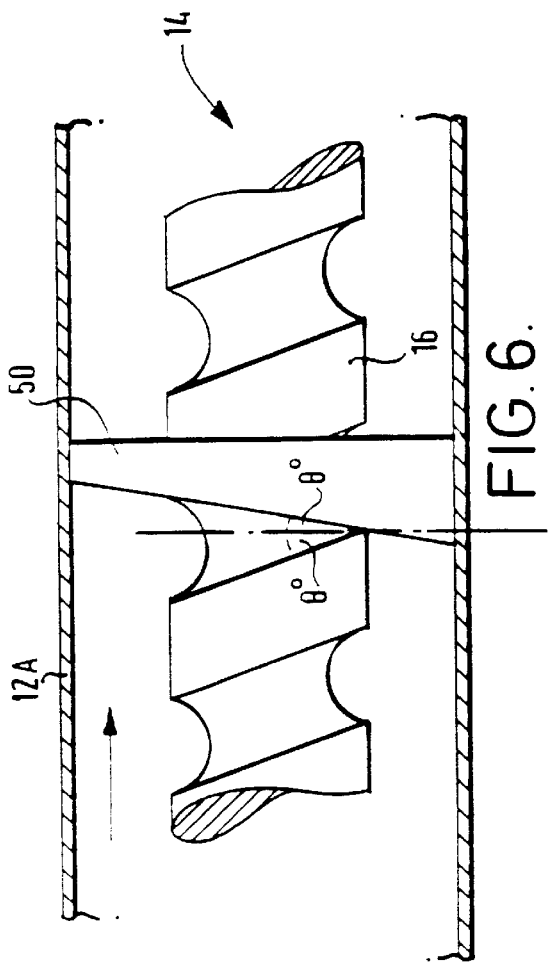
FIG. 5.
FIG. 6.
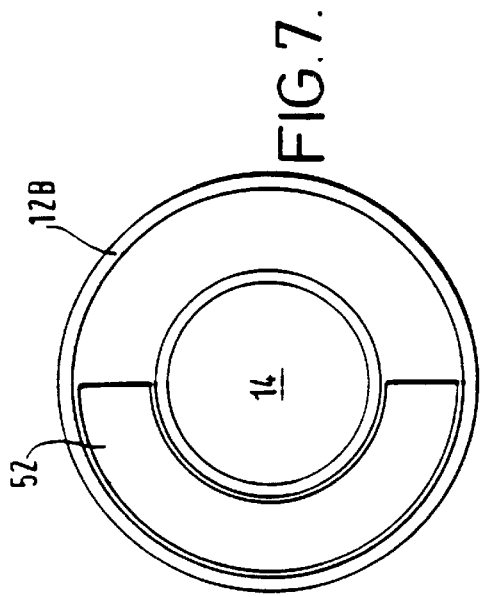
FIG. 7.
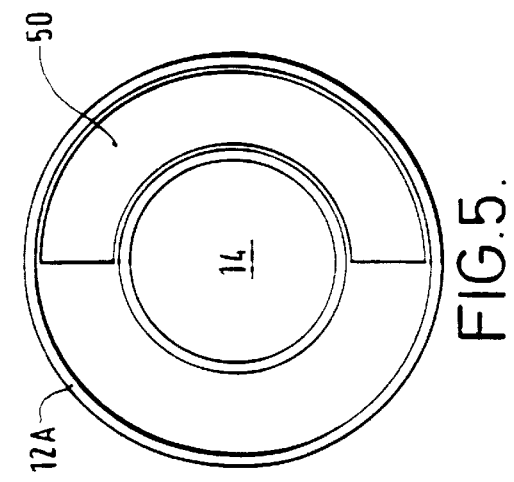
FIG. 8.

APPARATUS FOR HANDLING AND/OR CLEANSING TUBULAR ARTICLES

The present invention relates to apparatus for handling and/or cleansing tubular articles.

In the production of bottles for soft and other drinks, containers need to be produced of the right size and filled. Bottles of plastics materials are frequently used and are often supplied in a bottling plant in a "preform" state. Such preforms are shaped in the form of a relatively small test tube (closed at one end) with a threaded open upper end and a radially outwardly extending flange located just below the upper end. Each preform is gripped by its threaded end and flange, heated, and inflated in a mould until it expands to the size of the mould to provide, for example, a two or three litre container.

Any dust or debris left in the preform can have an adverse effect on the plastics during the heating and expansion phase. This often leads to weak or defective regions which, when subject to stress, are liable to rupture prematurely. To reduce this problem, the preforms are inverted and cleansed using a jet of ionised air. To invert the preforms usually requires a fairly complicated system.

German specification no 1914510 discloses a system where the containers are driven along an axially extending path and then entrained by a curved guide which guides the preforms through 180° while they travel over a relatively long axial distance.

It is an object of the present invention to provide an improved apparatus for inverting tubular articles.

According to the present invention there is provided apparatus for inverting tubular articles closed at their lower ends and open at their upper ends, the apparatus comprising an elongate tubular housing, an elongate rotary scroll accommodated within the housing and extending coaxially with said housing, the scroll having a helical fin in which the space between successive turns is sized to freely accommodate an intermediate portion of each tubular article fed to the housing, said housing having a lateral inlet opening at an upstream end thereof, the opening being sized and positioned to enable a succession of tubular articles, in an upright attitude, to be fed into the spaces between successive turns of the helical fin, axially extending stop means located inside the housing in the lower region thereof, the stop means being so positioned and shaped as to be engaged by the lower portion of each tubular member whereby limit displacement of said member within the housing about the axis of the housing and beyond the stop member and thereby define a path for said members to travel along one lateral side of the scroll, and engagement means within said housing at a predetermined upstream location in the said path, the engagement means being so profiled and positioned that when it is engaged by a tubular article driven along said path by the fin, it will substantially halt axial movement of the article and will cooperate with the fin to cause the article to be rotated about the axis of the scroll by said fin until it becomes inverted and further rotation is halted by engagement with said stop means, whereupon further rotation of the scroll, in cooperation with the stop means, will cause the tubular article to continue its axial travel along a path on the opposite lateral side of the scroll in its inverted state.

Apparatus for handling tubular articles will now be described, by way of example, with reference to the accompanying diagrammatic drawings, in which:

FIG. 2 is a cross-section taken on the line II—II of FIG. 1;

FIG. 3 is a side view at the discharge end of the apparatus;

FIGS. 4A and 4B are, respectively, front and side elevations of a spring.

FIG. 5 is an end view of a modified apparatus from the upstream end;

FIG. 6 is a fragmentary section through an upstream end portion of the modified apparatus of FIG. 5;

FIG. 7 is an end view of the apparatus of FIG. 5 from the downstream end; and FIG. 8 is a fragmentary section through a downstream end portion of the modified apparatus of FIG. 5.

Figure 1:
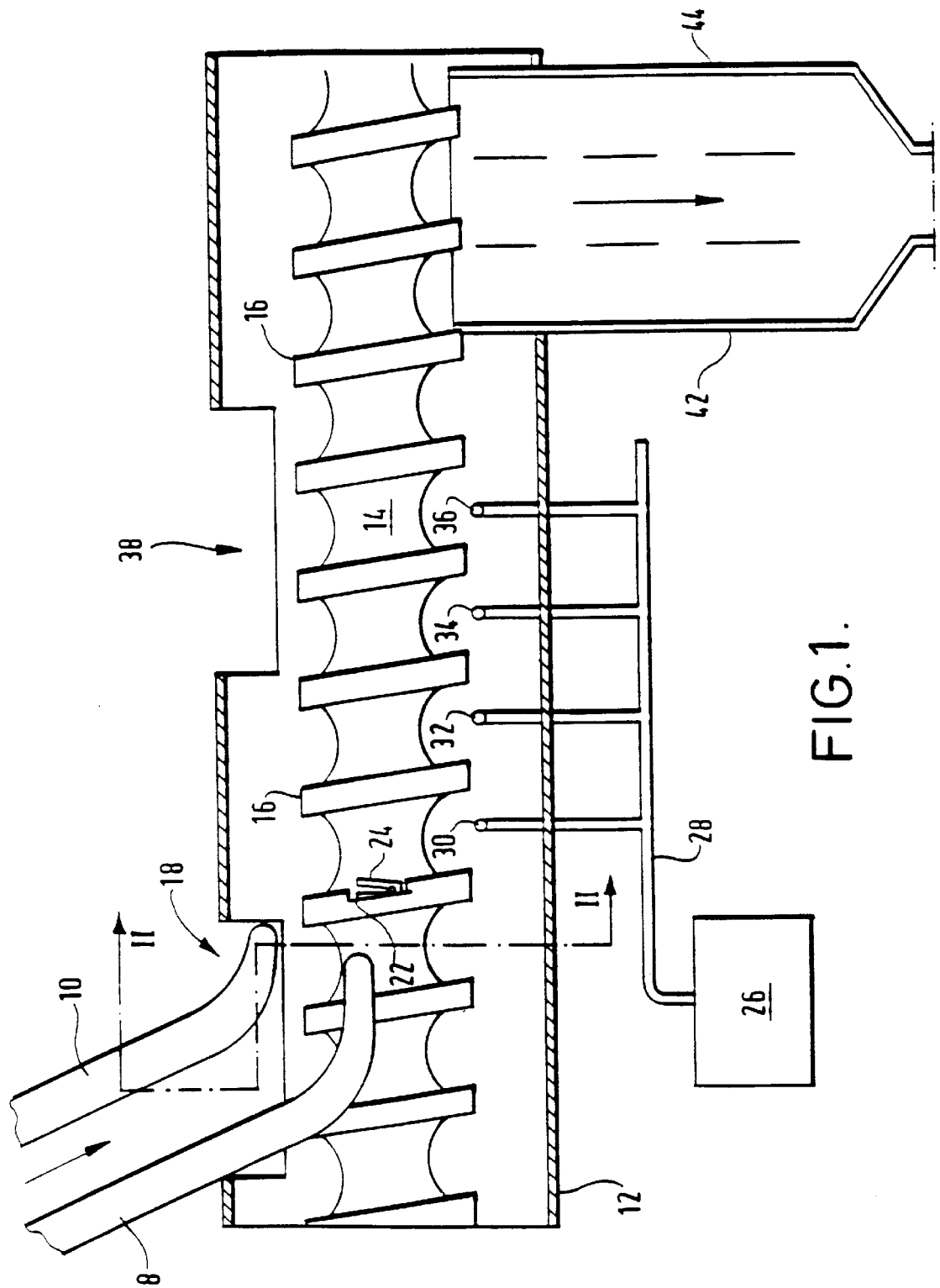
FIG. 1 is a cut away plan view of the apparatus.

The purpose of the apparatus to be described is to receive a succession of tubular articles each closed at its lower end, in the form of preforms and to displace them along a path through a dry rather than a wet cleansing station. During their passage through the cleansing station, each preform is inverted so that its open mouth faces downwardly. Each inverted preform is fed over a series of upwardly directed nozzles which inject ionised gas inside the preform. The ionised gas acts on fluff, dust, wood particles, polymer particles, insects and other residues inside the preforms to release such residues from contact with the sides of the preform to allow the residues to fall out. The gas, which may be air, acts on the residues to release any electrostatic attraction between the residues and the inner surface of the preform and also to scour the preform of the residues.

The preforms are then discharged from the apparatus and returned to their upright state. The preforms are guided to a machine for heating and expanding them to the required size before filling at a bottling station.

As can be more clearly seen from FIG. 2, each preform comprises a tubular member 2 closed at its lower end and having a screw threaded opening at the upper end portion 4. A radially outwardly extending flange 6 is located just below the upper end portion 4.

A succession of such preforms are entrained between a pair of guide rails 8 and 10 on which the flanges 6 rest.

The apparatus itself comprises an elongate tubular member 12 in the form of a hollow cylinder of stainless steel.

Extending coaxially with the cylinder 12 and accommodated therein is an elongate scroll 14 of plastics material. The scroll 14 is rotated about its axis by a motor (not shown). The scroll 14 has a helical fin 16. The gap between successive turns of the fin 16 is wide enough to just freely accommodate an intermediate portion of the preform 2.

The cylinder 12 has a side opening 18 at its upstream end through which preforms can be fed in an upright state into the spaces between successive turns of the fin 16. The guide rails 8 and 10 are curved at a location adjacent the opening 18, to guide the preforms along a path which initially extends radially towards the scroll and then axially along the scroll.

An axially extending guide stop 20 is mounted in the bottom of the cylinder 12 to limit the extent to which the preforms can rotate within the cylinder. At the point at which the preforms are introduced into the cylinder, the guide stop 20 maintains the performs upright at least for their initial displacement along the cylinder in response to rotation of the scroll.

At a location downstream of the opening 18, the fin 16 is provided with a recess 22 which accommodates a V-shaped spring 24. One arm of the spring is secured within the recess while the other arm projects out of the recess 22. When the projecting arm of the spring 24 engages an upright preform, it, in effect, clamps it to the fin 16 and, thereafter as the scroll rotates, the fin 16 lifts the preform against the gravitational force over the top of the scroll and into an inverted state. In due course, the threaded end 6 of the preform engages the guide stop 20 and so is prevent from further rotation with the fin 16. The spring 24 is then forced to disengage itself from the preform and the preform now continues to be displaced along the cylinder in an inverted attitude. Meanwhile, the spring 24 continues to rotate with the fin to engage and invert the next preform in succession. An air ioniser and pump 26 feeds ionised air along a conduit 28 to four axially spaced nozzles 30 to 36 located in the floor of the cylinder and directed upwardly towards the inverted preforms which pass immediately overhead. An opening (not shown) in the floor of the cylinder allows any debris purged from the preforms to be discharged into a container (not shown).

A lateral opening 38 is provided in the cylinder 12 on the same side as the opening 18 but downstream of the spring 24 so as to allow any preforms, which have inadvertently not been inverted by the spring 24, to be discharged from the cylinder 12.

At the downstream end of the cylinder 12 a discharge opening 48 is provided to allow preforms reaching the downstream end to fall freely out of the cylinder. A platform 40, inclined to both the horizontal and the vertical, is located just below the discharge opening 48 so that inverted preforms which land on the platform 40 will bounce upwardly and rotate into an inverted state. A pair of convergent guide rails 42 and 44 extending radially away from the cylinder constrain the preforms laterally. As the preforms fall downwardly the guide rails 42 and 44 will have converged sufficiently close together to support the flanges 6 and so be able to feed the now purged and upright preforms in a controlled manner onto the next processing stage.

The spring 24 is more clearly shown in FIGS. 4A and 4B.

As can be seen, the two arms 24A and 24B diverge from one another when the spring is in its relaxed state. This divergence may lie in the range of from 20° to 30°.

The spring 24 has a boss 24C at which the two arms meet. The boss 24C is provided with a through hole 24D for receiving a screw 46 which engages a radially extending screw threaded opening in the recess 22 of the fin 16. The boss 24C has a cut away portion 24E to accommodate the head of the screw 46.

The material of the spring is a modified nylon 66 with Molybdium Disulphide ($MoS_2$). Instead, other forms of spring or clamping devices may be used.

The spring is subject to wear and so is preferably readily replaceable.

In the apparatus described, the preforms are inverted with the aid of the V-shaped spring and are then reinverted by bouncing them off the platform 40. It will, however, be appreciated that the inversion and reinversion can be effected by other means.

FIGS. 5 to 8 illustrate a pair of spaced cams 50 and 52 rigid with the cylinder 12 which act to effect the inversion. The cam 50 is located in an upstream portion 12A of the cylinder just upstream of the nozzles 30 to 36 and the cam 52 is located in a downstream portion 12B of the cylinder just downstream of the nozzles 30 to 36. The cams 50 and 52 are each arcuate and subtend at an angle of 180°. The cam 50 is located on one side of a first vertical plane containing the axis of the scroll 14 while the cam 52 is located on the opposite side of the first rotational axis. The leading faces of the two cams lie in respective spaced parallel planes which make an angle θ° with a second vertical plane extending normal to the axis of the scroll 14. The angle θ° has the same magnitude as the angle θ° that the fin 16 makes with the second vertical plane but lies on the opposite side of the second vertical plane.

Thus, in operation, as the scroll drives preforms along the upstream end 12A of the cylinder, the lower end of the preform engages the sloping leading face of the cam 50 first. As the scroll continues to drive the preform, the reaction between the lower end of the preform and the cam 50 will drive the preform in an anti-clockwise sense about the axis of the scroll 14 (as viewed in FIG. 5). Rotation of the preform will continue until the preform is inverted and slips down the scroll on the opposite side of the axis. At this point, the preform will have cleared the scroll 14 and will continue over the nozzles 30 to 36 in an inverted state.

As the inverted preforms enter the downstream portion 12A of the cylinder, the lower ends of the inverted preforms will now strike the sloping leading face of the cam 52. As with the cam 50, the preforms will now reinvert themselves and so can be discharged from the cylinder 12 in an upright state.

The cams 50 and 52 are preferably of plastics and their leading faces preferably having a low coefficient of friction.

I claim:

1. Apparatus for inverting tubular articles closed at their lower ends and open at their upper ends, the apparatus comprising tubular housing elongated along an axis, a rotary scroll elongated along an axis accommodated within the housing and extending coaxially with said housing, the scroll having a helical fin in which the space between successive turns is sized to freely accommodate an intermediate portion of each said article fed to the housing, said housing having a lateral inlet opening at an upstream end thereof, the opening being sized and positioned to enable a succession of said articles, in an upright attitude, to be fed into the spaces between successive turns of the helical fin, stop means extending along the axis of the scroll located inside the housing in the lower region thereof, the stop means being so positioned and shaped as to be engaged by the lower portion of each said article thereby limiting displacement of said article within the housing about the axis of the housing and beyond the stop means and thereby define a path for said article to travel along one lateral side of the scroll, and engagement means within said housing at a predetermined upstream location in the said path for engagement with said article, the engagement means positioned so that when it is engaged by said article driven along said path by the fin, that it will halt further advancement of said article along the scroll axis and will cooperate with the fin to cause the article to be rotated about the scroll axis by said fin until it becomes inverted and further rotation is halted by engagement with said stop means, whereupon further rotation of the scroll, in cooperation with the stop means, will cause said article to continue its travel along the scroll axis along a path on the opposite lateral side of the scroll in its inverted state.

2. Apparatus according to claim 1, wherein the engagement means comprises resilient means mounted on said fin which when enraging said article secures said article to the fin to cause it to perform said rotation with said fin until inverted, where after further rotation of the scroll causes said resilient means to disengage said fin.

3. Apparatus according to claim 2, wherein said resilient means comprises a V-shaped spring member partially accommodated within a recess in said fin and having a pair of arms which diverge away from one another from a central boss.

4. Apparatus according to claim 3, wherein said spring means comprises a plastics material containing Molybdium Disulphide (MoS2).

5. Apparatus according to any one of claims 2 to 4, wherein the housing has a lower discharge opening at a downstream end thereof through which said articles reaching said downstream end in an inverted attitude may be discharged.

6. Apparatus according to claim 5, comprising means for reinverting each inverted said article, said means providing a surface inclined to both the horizontal and vertical located below said discharge opening at a location in which each inverted said article lands and is imparted with an angular reaction so as to bounce up into an upright attitude, and guide means for engaging each tubular article as it reaches its upright attitude, to feed the article in its upright state along a predetermined path.

7. Apparatus according to claim 6, wherein the guide means are arranged to engage a radially outwardly directed flange adjacent an upper end of each tubular article.

8. Apparatus according to claim 1 including means for engaging a flange of each said article and feeding each said article in succession into said inlet opening.

9. Apparatus according to claim 2, including means for directing at least one stream of ionised gas upwardly into each inverted said article as it is driven along said housing.

10. Apparatus according to claim 9, wherein the housing is provided with an opening below said ionised gas stream producing means to allow debris from said article to be discharged from said housing.

11. Apparatus for inverting tubular articles closed at their lower ends and open at their upper ends, the apparatus comprising tubular housing elongated along an axis, a rotary scroll elongated along an axis accommodated within the housing and extending coaxially with said housing, the scroll having a helical fin in which the space between successive turns is sized to freely accommodate an intermediate portion of each said article fed to the housing, said housing having a lateral inlet opening at an upstream end thereof, the opening being sized and positioned to enable a succession of said articles, in an upright attitude, to be fed into the spaces between successive turns of the helical fin, stop means extending along the axis of the scroll located inside the housing in the lower region thereof, the stop means being so positioned and shaped as to be engaged by the lower portion of each said article thereby limiting displacement of said article within the housing about the axis of the housing and beyond the stop means and thereby define a path for said article to travel along one lateral side of the scroll, and resilient means mounted on the fin so that when engaged by said article being axially translated along the path, the resilient means will tap said article between itself and the fin, whereupon axial translation of the article is halted and the article will rotate with the fin about the scroll axis into an inverted state at which point further rotation is halted by engagement with said stop means, whereupon further rotation of the scroll, in cooperation with the stop means, will cause said article to continue its axial travel along a path on the opposite lateral side of the scroll in its inverted state.

12. Apparatus for inverting tubular articles closed at their lower ends and open at their upper ends, the apparatus comprising tubular housing elongated along an axis, a rotary scroll elongated along an axis accommodated within the housing and extending coaxially with said housing, the scroll having a helical fin in which the space between successive turns is sized to freely accommodate an intermediate portion of each said article fed to the housing, said housing having a lateral inlet opening at an upstream end thereof, the opening being sized and positioned to enable a succession of said articles, in an upright attitude, to be fed into the spaces between successive turns of the helical fin, stop means extending alone the axis of the scroll located inside the housing in the lower region thereof, the stop means being so positioned and shaped as to be engaged by the lower portion of each said article thereby limiting displacement of said article within the housing about the axis of the housing and beyond the stop means and thereby define a path for said article to travel along one lateral side of the scroll, and resilient means mounted on the fin so that when engaged by said article being axially translated along the path, the resilient means will trap said article between itself and the fin, whereupon axial translation of the article is halted and the article will rotate with the fin about the scroll axis into an inverted state at which point further rotation is halted by engagement with said stop means, whereupon further rotation of the scroll, in cooperation with the stop means, will cause said article to continue its axial travel along a path on the opposite lateral side of the scroll in its inverted state, wherein said resilient means comprises a V-shaped spring member partially accommodated within a recess in said fin and having a pair of arms which diverge away from one another from a central boss.

* * * * *